Patented May 1, 1945

2,374,711

UNITED STATES PATENT OFFICE 2,374,711

CHLORINATION OF PIPERYLENE

Frank J. Soday, Swarthmore, Pa., assignor to The United Gas Improvement Company, a corporation of Pennsylvania No Drawing. Application September 9, 1941,
Serial No. 410,174

3 Claims. (Cl. 260—652)

This invention relates to the chlorination of piperylene.

More particularly, this invention pertains to the reaction of chlorine with piperylene to form chlorinated piperylene compounds.

It is an object of this invention to provide as new compositions of matter the products obtained by the chlorination of piperylene, or light oil piperylene fractions, under carefully controlled conditions. Another object of this invention is the chlorination of piperylene under conditions designed to produce the maximum yields of the normal chlorine addition products, namely, piperylene dichlorides and piperylene tetrachlorides. A further object of this invention is the provision of new chemical compounds having utility in a wide variety of chemical processes. Other objects of the invention will be apparent to those skilled in the art upon an inspection of the specification and claims.

Piperylene, or pentadiene-1,3, is a conjugated diolefine possessing five carbon atoms. Due to the presence of two olefinic bonds in the molecule, and to the dissimilarity of the hydrocarbon radicals attached to the central double bond, piperylene can exist in the following two geometrically isomeric forms:

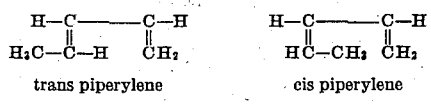

trans piperylene      cis piperylene

Due to the presence of two double bonds in the piperylene molecule, the addition of chlorine to piperylene in the absence of any substitution or decomposition reactions normally leads to the formation of two major groups of derivatives, namely, piperylene dichlorides and piperylene tetrachlorides.

The direct chlorinated derivatives of piperylene exist in several isomeric forms due to the presence of a double bond in piperylene dichloride and to the presence of asymmetric carbon atoms in both the dichloride and tetrachloride derivatives.

Three types of isomerism may exist in chlorinated piperylene derivatives, namely, stereo or space isomerism, structural or chain isomerism, and geometric isomerism.

Stereo isomerism is based upon the presence of asymmetrical carbon atoms, that is, carbon atoms to which are directly attached four dissimilar atoms or groups in the molecule. Thus, for example, piperylene tetrachloride has three asymmetric carbon atoms, and therefore may exist in the form of eight optical isomers, or four space isomers, representing racemic modifications. These may be represented graphically as follows:

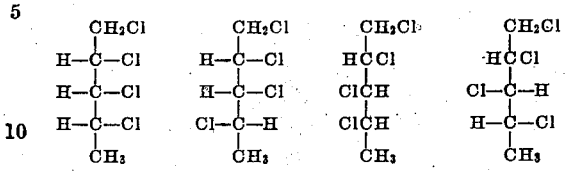

These four isomeric piperylene tetrachlorides may be expected to possess dissimilar physical properties. Their chemical properties probably are identical, although their relative rates of reaction may differ to some extent. They would not be expected to show optical activity, as equivalent amounts of the d and l forms of each isomer should be formed in each case. While it is theoretically possible to effect a separation of the d and l forms by physical or chemical means, thus resulting in the possible formation of 8 isomeric piperylene tetrachlorides, such a separation would be very difficult to effect.

Structural or chain isomerism, in which two or more substituent atoms or groups are attached to one carbon atom, probably does not manifest itself to any great extent in the chlorination of piperylene until chlorinated products having more than four chlorine atoms present in the molecule are obtained. The major portion of the mono-, di-, tri- and tetra-chlorinated piperylene derivatives may be assumed to be compounds in which each of the substituent chlorine atoms are attached to different carbon atoms.

In the case of chlorinated piperylene derivatives containing more than four chlorine atoms, however, structural isomerism will play an increasingly important role, very largely increasing the number of chlorinated derivatives obtained.

Geometric isomerism may be observed in hydrocarbons, or derivatives thereof, possessing a double bond and the necessary arrangement of substituent groups. Thus, if two similar substituent groups are attached to the same carbon atom, which in turn is attached to the double bond present in the molecule, no geometric isomers will be present. As previously pointed out, piperylene may exist in the form of two geometric isomers, namely, cis-piperylene and trans-piperylene.

As it is essential to have a double bond present in the molecule for this type of isomerism.

it is obvious that it will extend its greatest influence in the less highly chlorinated piperylene derivatives and will entirely disappear when both double bonds in the piperylene molecule have been chlorinated.

The chlorination of piperylene, therefore, is a very complex reaction and may lead to an almost infinitely large number of chlorinated derivatives. However, I have found that by a suitable choice of operating procedures, to be more particularly described hereinafter, large yields of certain chlorinated derivatives, and of certain classes of chlorinated derivatives, may be obtained.

The chlorination of piperylene may be assumed to be initiated by the addition of one molecule of chlorine to one molecule of piperylene to form a dichloropentene. Five normal compounds theoretically may be formed in this manner, namely, the cis, and trans forms of 1,4-dichloropentene-2.

the cis and trans forms of 1,2-dichloropentene-3,

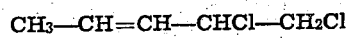
and
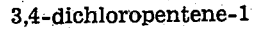

Stereo-isomers and structural isomers of these compounds also may be present in the chlorinated products.

The second stage of the chlorination may be assumed to be the addition of a second molecule of chlorine to one or more of the dichlorides shown to form piperylene tetrachlorides. As indicated previously these may exist in four stereo-isomeric forms.

If the chlorination of the dichlorides does not take place entirely by addition, and substitution products are formed, tetrachlorides possessing entirely different structures may be obtained. These latter products also may be present in the form of geometric, structural, and/or stereo-isomers.

In addition, tetrachlorides also may be formed by the direct and simultaneous addition of two molecules of chlorine to the piperylene molecule. As this reaction mechanism involves the simultaneous collision of three molecules, it is apparent that piperylene tetrachlorides are formed mainly by the addition of one molecule of chlorine to a piperylene dichloride.

The chlorinated piperylene derivatives formed by the direct addition of one or two molecules of chlorine to the piperylene molecule, in the absence of substitution and/or decomposition reactions, namely, piperylene dichlorides possessing one double bond and saturated piperylene tetrachlorides, may be regarded as the normal chlorinated piperylene derivatives. However, as will be more particularly pointed out hereinafter, such products may not constitute the major products obtained by the action of chlorine on piperylene. In fact, piperylene dichlorides and/or piperylene tetrachlorides may comprise the minor portion of the reaction products obtained, or they may be almost entirely absent from such products.

The chlorinated products obtained by the action of chlorine on piperylene may contain, in addition to the piperylene dichlorides and piperylene tetrachlorides previously referred to, monochloro pentadienes, trichloropentenes, pentachloropentanes, hexachloropentanes, and similar products. In contrast to the piperylene dichlorides and piperylene tetrachlorides, these products are obtained as the result of (1) substitution, (2) substitution and addition, (3) substitution and decomposition, or (4) addition and decomposition reactions.

Monochloropentadienes may be formed by the cleavage of hydrogen and chlorine from one of the piperylene dichlorides initially formed. Thus, 1,4-dichloropentene-2 may form 4-chloropentadiene-1,2; 5-chloropentadiene-1,3; and 1-chloropentadiene-2,3; 3,4-dichloropentene-1 may form 4-chloropentadiene-1,3; 4-chloropentadiene-1,2; 3-chloropentadiene-1,4; and 3-chloropentadiene-1,3; and 1,2-dichloropentene-3 may form 1-chloropentadiene-2,3; 1-chloropentadiene-1,3; and 2-chloropentadiene-1,3. Such compounds also can exist in the form of geometric or stereo-isomers.

Trichloropentenes may be formed by the addition of a molecule of chlorine to the monochloropentadienes listed, or by the cleavage of HCl from one or more piperylene tetrachlorides. Consequently, the number of possible trichloropentenes which may be obtained by the addition of chlorine to piperylene is very large. In addition, these compounds also may exist in the form of geometrical, structural, or stereo-isomers.

Pentachloropentanes may be formed by the addition of a molecule of chlorine to the trichloropentenes described previously, or by the attachment of one atom of chlorine, by substitution reactions, to one of the piperylene tetrachlorides.

If one chlorine atom is located on each of the five carbon atoms present in the piperylene molecule, three space isomers may be formed.

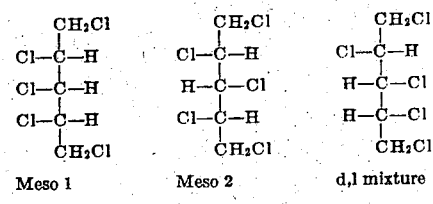

If the five chlorine atoms are not on five different carbon atoms, numerous chain isomers may be present.

Hexachloropentanes, as well as more highly chlorinated derivatives, may be formed by substituting chlorine for certain of the hydrogen atoms present in the pentachloropentanes, or other less highly chlorinated piperylene derivatives. These compounds also may exist in the form of structural or space isomers.

In addition to the foregoing, piperylene dichlorides and piperylene tetrachlorides also may be obtained by substitution, or substitution and addition reactions. However, it should be emphasized that the addition type of reaction, which has been discussed previously, normally accounts for the production of the major portion, if not all, of the piperylene dichlorides and piperylene tetrachlorides obtained.

The piperylene dichlorides and piperylene tetrachlorides formed as the result of substitution, or any combination of substitution, addition, and/or decomposition reactions, possess different structures from those obtained by the direct addition of chlorine to piperylene, and may exist in the form of space, structural or geometric isomers.

The foregoing discussion may be summarized by stating that the direct addition of chlorine to piperylene results in the production of a number of normal piperylene dichlorides and piperylene tetrachlorides, while the reaction of chlorine with piperylene by (1) substitution, (2) substitution and addition, (3) substitution and decomposition, and/or (4) addition and decomposition reactions results in the production of a very large number of chlorinated piperylene derivatives containing from one to five, or more, chlorine atoms. These latter products also may be saturated in nature, or they may contain one or more double bonds.

The more important of these reactions may be graphically summarized as follows.

Section A—Normal addition reactions

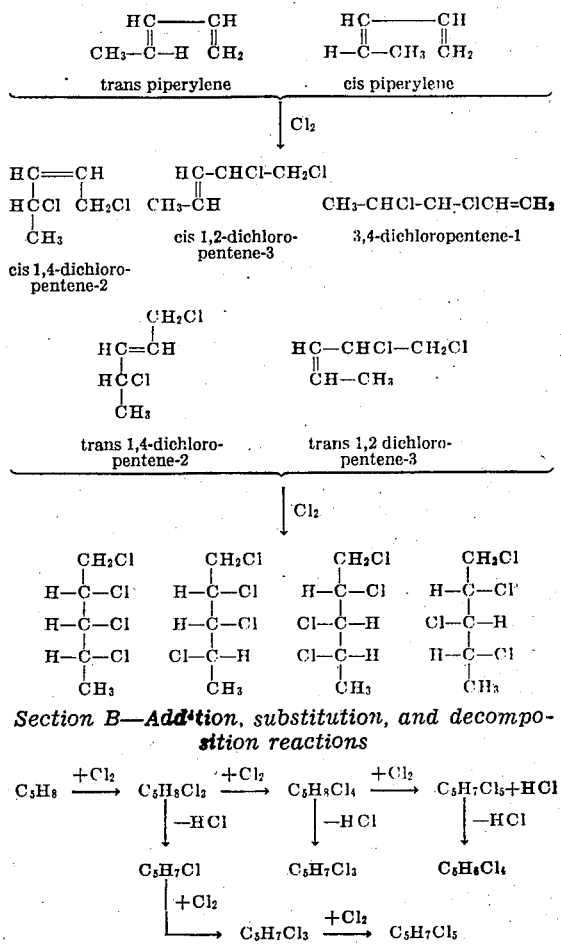

Section B—Addition, substitution, and decomposition reactions

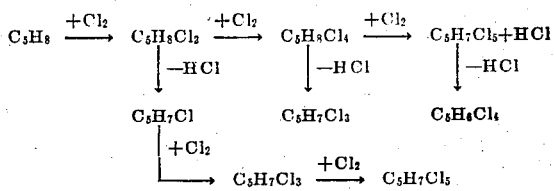

The foregoing reactions serve only to illustrate the more important of the reactions involved in the chlorination of piperylene, and the isolation of the reaction products, and are not intended to represent the entire scope of such reactions.

I have found that the chlorination of piperylene may be carried out in such a way as to give excellent yields of the normal addition compounds, namely, piperylene dichlorides and piperylene tetrachlorides, by a suitable control of certain of the reaction variables, the most important of which are the (1) ratio of chlorine to piperylene, and (2) the method employed in contacting the reactants. In addition, the temperature, time of contact, concentration and degree of purity of the respective reactants, and the presence or absence of solvents and/or diluting agents, or mixtures thereof, also are important reaction variables.

Piperylene is a very reactive compound and may be readily polymerized to form a wide variety of synthetic rubber polymers. Consequently, great care must be exercised in the chlorinating process to eliminate all polymerizing influences, or to conduct the chlorination in such a way as to counteract or retard the effect of such polymerizing influences or conditions.

As hydrogen chloride is an excellent catalyst for the polymerization of piperylene, or chlorinated piperylene compounds containing one or more double bonds, it is important that the chlorination be carried out in such a way that the formation of this material, especially during the early stages of the process, is retarded or completely eliminated.

In the same way, the use of certain common chlorinating catalysts must be dispensed with, particularly in batch chlorinating operations, in order to insure reasonable yields of the desired chlorinated products by retarding the rate of polymerization of piperylene, or of certain unsaturated chlorinated piperylene derivatives. Thus, for example, ferric chloride and aluminum chloride are widely used as chlorinating catalysts for the chlorination of a wide variety of hydrocarbon, and other, materials. The use of either of these catalysts for the chlorination of piperylene in batch-type operations results in the polymerization of the greater portion or all of the piperylene present to form synthetic rubber type polymers, with a corresponding reduction in the yield of chlorinated compounds obtained.

The isolation and/or separation of the chlorinated products by fractional distillation methods also must be carried out with care due to the tendency of certain of the chlorinated unsaturated products present to polymerize upon the application of heat. In addition, the prolonged application of heat may result in the decomposition of a portion of the chlorinated products present to form unsaturated, or more highly unsaturated, chlorinated, or other, piperylene derivatives, with the simultaneous formation of hydrogen chloride. The hydrogen chloride liberated then serves as a catalyst, thus increasing the rate of polymerization of the unsaturated materials present.

It is desirable, therefore, to remove any excess chlorine and hydrogen chloride from the reaction products prior to distillation, particularly when the reaction has been carried out in such a way as to produce unsaturated products, such as piperylene dichlorides. This may be accomplished, among other ways, by washing the crude reaction product with an alkaline solution prior to distillation.

This may be summarized by stating that the chlorination of piperylene should be carried out in a minimum period of time, consistent with good yields, and that the fractionation of the chlorinated products also should be carried out in a minimum period of time. As the chlorinated piperylene products normally must be fractionated in an efficient column in order to separate the respective products to the desired extent, it is desirable that such operations be carried out under reduced pressures. In addition, certain inhibitors may be employed to reduce the rate of polymerization of the unsaturated chlorinated piperylene derivatives during the fractionation operations, and means may be taken to neutralize or absorb the hydrogen chloride formed during such operations.

Excellent results are obtained when piperylene, or light oil piperylene fractions, are chlorinated in moderate sized batches, or in a continuous system, and when the chlorinated piperylene derivatives are separated in a fractionating system containing only a moderate quantity of the chlorinated products, or when the chlorinated piperylene derivatives are separated in a continuous fractionating unit.

Piperylene obtained from any desired source may be used in the production of chlorinated piperylene derivatives of the type described herein. A desirable source of piperylene for this purpose is the light oil obtained as a by-product in the manufacture of carburetted water gas, coal gas, oil gas, and the like.

A particularly desirable source of the piperylene or piperylene fractions to be used in processes of the type described herein is that obtained by the pyrolysis of petroleum, or petroleum hydrocarbons, in the presence of steam at temperatures above 1100° F. The piperylene obtained in this manner usually is in the form of a fraction possessing a fairly wide boiling range, and containing minor proportions of certain other diolefines, such as butadiene, isoprene, and/or cyclopentadiene. Such fractions may be used for the production of chlorinated piperylene derivatives of the type described herein, or narrower boiling fractions, containing lesser quantities of diolefines other than piperylene may be used for this purpose with excellent results.

A preferred embodiment of this invention is the use of light oil piperylene fractions derived from oil gas and containing up to 90% by weight of piperylene for the production of chlorinated piperylene derivatives. The use of piperylene fractions having a higher concentration of piperylene in the chlorination processes described herein usually results in a somewhat higher yield of polymers than when fractions containing lesser quantities of piperylene are employed, particularly when batch chlorinating processes in the absence of any solvent and/or diluting agent are employed.

As pointed out previously, the ratio of chlorine to piperylene employed in a given reaction profoundly affects the character of the products obtained. The reaction of one mol of chlorine with one mol of piperylene, particularly when the reaction is conducted in such a way that a slight excess of piperylene is present in the reaction zone at all times, results in the production of chlorinated piperylene derivatives containing relatively large proportions of piperylene dichlorides. The reaction of two mols of chlorine with piperylene, on the other hand, results in the production of chlorinated products containing large proportions of piperylene tetrachlorides.

The method of combining the reactants also has a considerable influence upon the nature of the chlorinated derivatives obtained. Thus, in the addition of one mol of chlorine to one mol of piperylene to form piperylene dichlorides, excellent yields are obtained if an excess of chlorine in the reaction zone for any appreciable period of time is avoided.

The chlorination of piperylene, or of a light oil piperylene fraction may be carried out in any desired batch or continuous system or unit, and either one or both of the reactants may be in the liquid or gaseous state, or in the form of a solution or dispersion in a suitable solvent, or mixture of solvents, and/or gases.

The time of contact is important from the standpoint of inhibiting secondary chlorinating and/or decomposition reactions. The contact time, however, may vary from a few seconds, or fractions of a second, in a continuous process to several hours in a batchwise process. When fairly long reaction times are used, suitable precautions should be observed in order to prevent, or retard the rate of, certain undesirable secondary reactions.

The temperature also may vary over fairly wide limits depending upon the concentration of the piperylene or piperylene fraction employed, the presence or absence of solvents or diluents, the contact time, and the method of reaction employed. When chlorinating piperylene fractions in the liquid state, particularly when certain solvents or diluents are present, reaction temperatures ranging from −60 to 35° C. may be employed with excellent results. When the reaction is conducted in the gaseous state, particularly when the piperylene is in the form of a light oil fraction and/or certain solvents or diluents are present, reaction temperatures in the range of 35 to 150° C. may be employed.

In general, it may be said that satisfactory results are obtained when piperylene or light oil piperylene fractions are chlorinated in the liquid state at temperatures below 35° C., and when piperylene or light oil piperylene fractions are chlorinated in the gaseous state in a continuous manner at temperatures between 35 and 150° C. Temperatures other than those listed also may be employed with satisfactory results in certain cases if due precautions are taken to prevent or retard any undesirable secondary reactions.

As indicated previously, one or more of the reactants may be dissolved or dispersed in a suitable solvent or mixture of solvents and/or gases prior to or during the reaction. The use of solvents and/or gases as diluting agents tends to inhibit, or retard the rate of, certain undesirable secondary reactions, such as polymerizing or dehalogenating reactions. Examples of suitable solvents for piperylene or piperylene fractions are other hydrocarbons or hydrocarbon fractions, preferably saturated in nature, and chlorinated hydrocarbons. Examples of suitable diluting agents for chlorine are inert gases, such as nitrogen and carbon dioxide.

The chlorination of piperylene now will be discussed with particular reference to the particular type or class of products desired.

PIPERYLENE DICHLORIDES

I have found that piperylene dichlorides (dichloropentenes) may be prepared in good yields by the reaction of chlorine and piperylene, particularly when the piperylene is in the form of a light oil piperylene fraction, in approximately molar ratios under carefully controlled conditions. The reaction may be carried out with either one or both of the reactants in the liquid or gaseous state, in the form of a solution in a suitable solvent, or mixture of solvents, or dispersed in a gas or mixture of gases.

The reaction may be conducted in a continuous manner, such as by the simultaneous addition of the reactants to a suitable reaction vessel or zone maintained at the desired reaction temperature. The reaction unit if desired, may comprise a tube bundle or coil immersed in, or in contact with, a liquid bath maintained at the desired temperature level.

The process also may be carried out in a batchwise manner, such as by the addition of chlorine to piperylene or a light oil piperylene fraction, or a solution thereof, in a reaction vessel or unit provided with temperature control means. Very satisfactory results may be obtained in this manner, particularly when the quantities involved are maintained within reasonable limits.

Although the reaction of excess quantities of chlorine with piperylene also leads to the production of piperylene dichlorides, the yields obtained in this manner usually are considerably lower than when the reactants are combined in molar quantities. Consequently, the preferred method of preparing piperylene dichlorides comprises conducting the reaction in such a way as to avoid an excess of chlorine in the reaction chamber or zone for appreciable periods of time. Excellent results are obtained when an excess of piperylene is maintained in the reaction chamber or zone throughout the reaction.

The reaction temperature may vary within fairly wide limits, provided that suitable precautions are observed to inhibit, or retard the rate of, undesired secondary reactions. When light oil piperylene fractions containing less than 90% piperylene are employed, or when the piperylene is diluted with a suitable solvent, and the reaction is carried out in a batchwise manner, reaction temperatures in the range of −60 to 35° C. may be employed with excellent results.

The preparation of piperylene dichlorides by the chlorination of light oil piperylene fractions is illustrated by the following examples.

Example 1

A 75 gram portion of piperylene, in the form of a light oil piperylene fraction containing 77.5% by weight of piperylene, was added to a 3-neck flask equipped with a motor driven agitator. The flask was immersed in a cooling bath consisting of a mixture of solid carbon dioxide and toluene.

A total of 80 grams of chlorine was added to the reaction vessel with good agitation during the course of 5 hours, the temperature being maintained at −45° C. during this entire period.

The reaction mixture was permitted to come to room temperature, after which it was washed with an aqueous solution of sodium bicarbonate and dried with anhydrous calcium chloride. The dried reaction products then were fractionated in a fractionating column packed with glass helices and possessing a fractionating efficiency equivalent to 11 theoretical plates. The column was equipped with a total reflux, variable take-off head, thus permitting any desired reflux ratio to be maintained at will. A fairly high reflux ratio was maintained throughout the present distillation.

Two isomeric piperylene dichlorides were isolated, namely, a low-boiling form and a high-boiling form, together with an intermediate-boiling fraction which probably comprised a mixture of the low-boiling and high-boiling dichlorides, together with lesser quantities of other piperylene dichlorides. The quantities of the low-boiling and the high-boiling dichlorides obtained corresponded to yields of 21.7% and 12.2%, respectively, while the quantity of the intermediate-boiling fraction isolated was equivalent to a yield of 20.6%.

The low-boiling and high-boiling piperylene dichlorides obtained had the following physical properties.

|  | Low-boiling dichloride | High-boiling dichloride |
| --- | --- | --- |
| Boiling point °C | 64 @ 36 mm | 81 @ 35 mm. |
| Density ($d$ 20/20) | 1.171 | 1.137. |
| Refractive index ($N^{20}$) | 1.4765 | 1.4784. |

Example 2

A similar portion of the same light oil piperylene fraction employed in Example I was added to 150 grams of carbon tetrachloride, after which the mixture was cooled to 10° C. A total of 76 grams of chlorine was added to this mixture during a period of five hours with good agitation, the temperature being maintained at 10° C. during this period. The reaction mixture then was treated in a manner similar to that employed in Example 1 to isolate the reaction products.

The low-boiling and high-boiling dichlorides were obtained in yields of 37.1% and 18.0%, respectively, a total of 2.8% of an intermediate boiling fraction also being obtained. The low-boiling piperylene dichloride had a boiling point of 55° C. @ 26 mm., a density ($d$ 20/20) of 1.1717, and a refractive index ($N^{20}$) of 1.4766, while the high-boiling dichloride had a boiling point of 57° C. @ 10 mm., a density ($d$ 20/20) of 1.131, and a refractive index of 1.4786.

Example 3

A similar portion of the same light oil piperylene fraction employed in Example 1 was treated with 75 grams of chlorine at a temperature of 15° C. during a period of 3½ hours. Upon neutralizing and isolating the products according to the method described in Example 1, a 24.7% yield of the low-boiling dichloride was obtained. The high-boiling dichloride was obtained in a yield of 5.8%, while the intermediate fraction was obtained in a yield of 7.7%. In addition, a 19.3% yield of a mono-chlorinated piperylene was obtained. These products had the following physical properties:

|  | Low-boiling dichloride | High-boiling dichloride | Mono-chlorinated piperylene |
| --- | --- | --- | --- |
| Boiling point °C | 57.5–58.5 @ 31 mm | 76 @ 28.5 mm | 44 @ 80 mm. |
| Density ($d$ 20/4) | 1.1640 | 1.130 | 0.906. |
| Refractive index ($N^{20}$) | 1.4750 | 1.4772 | 1.4431. |

Example 4

A 150 gram portion of piperylene, in the form of the same light oil piperylene fraction employed in Example 1, was added to a suitable reaction vessel provided with an agitator and containing 100 grams of petroleum ether. A total of 160 grams of chlorine was added to this mixture with good agitation during the course of 7½ hours at a temperature of 15° C.

Upon neutralizing and isolating the reaction products in a manner similar to that described in Example 1, the low-boiling and high-boiling piperylene dichlorides were obtained in yields of 25.2 and 23.0%, respectively. The intermediate boiling fraction was obtained in a yield of 16.0%. In addition, a mono-chlorinated piperylene was obtained in a yield of 12.1%. These products had the following physical properties.

|  | Low-boiling dichloride | High-boiling dichloride | Mono-chlorinated piperylene |
|---|---|---|---|
| Boiling point °C | 57-59 @ 26 mm | 71-72.5 @ 26 mm | 32 @ 43 mm |
| Density (d 20/4) | 1.1577 | 1.1346 | 0.912 |

Example 5

A 300 gram portion of piperylene in the form of an 80% light oil piperylene fraction was chlorinated at a temperature of −20° C. during a period of four hours. A total of 297 grams of chlorine was added during this period.

After neutralizing the reaction mixture, the chlorinated products were isolated in a fractionating column containing 23 theoretical plates. The low-boiling and high-boiling dichlorides were obtained in yields of 25.7% and 13.4%, respectively. A 4.6% yield of an intermediate-boiling dichloride fraction also was obtained.

In addition, an 8.6% yield of a mono-chlorinated piperylene was obtained, as well as an 11.6% yield of a chlorinated fraction boiling intermediate between the mono-chlorinated piperylene fraction and the low-boiling dichloride fraction.

These products had the following physical properties:

|  | Low-boiling dichloride | High-boiling dichloride | Mono-chlorinated piperylene |
|---|---|---|---|
| Boiling point °C | 67.5 @ 59 mm | 85 @ 54 mm | 39 @ 125 mm |
| Density (d 20/4) | 1.1645 | 1.1254 | 0.912 |
| Refractive index (N20) | 1.4754 | 1.4791 | 1.4398 |

Example 6

A 450 gram portion of piperylene in the form of a 90% light oil piperylene fraction was chlorinated at a temperature of −40° C. during a period of 4½ hours, a total of 474 grams of chlorine being added during this period.

The reaction mixture was neutralized by washing with an aqueous solution of sodium bicarbonate, dried over anhydrous calcium chloride, and fractionated in a column having a fractionating efficiency equivalent to 23 theoretical plates.

The low-boiling and high-boiling dichlorides were isolated in yields of 22.8% and 7.9%, respectively. An intermediate-boiling dichloride fraction was obtained in a yield of 8.4%.

A mono-chlorinated piperylene was obtained in a yield of 1.0%, in addition to a 6.9% yield of the mono-chlorinated piperylene-piperylene dichloride intermediate fraction.

These products had the following physical properties:

|  | Low-boiling dichloride | High-boiling dichloride | Mono-chlorinated piperylene |
|---|---|---|---|
| Boiling point °C | 59 @ 24 mm | 64 @ 9 mm | 35 @ 104 mm |
| Density (d 20/4) | 1.1432 | 1.1233 | 0.928 |
| Refractive index (N20) | 1.4752 | 1.4790 | 1.4474 |

Example 7

A 150 gram portion of piperylene, in the form of a 77.5% light oil piperylene fraction, was treated with 142 grams of chlorine, 94 grams of which was added to the fraction at a temperature of −40° C., the remaining 48 grams being added at a temperature of 10° C.

The reaction product was neutralized with an aqueous solution of sodium bicarbonate, after which the product was dried with anhydrous calcium chloride and fractionated in a 23 plate column.

Two piperylene dichlorides having somewhat different physical properties than those obtained in the preceding examples, and possessing very acrid, disagreeable odors, were isolated. The physical properties of these samples were as follows:

|  | Sample 1 | Sample 2 |
|---|---|---|
| Boiling point °C | 121-122 @ 5.5 mm | 141-142 @ 5.5 mm |
| Density (d20/4) | 1.1612 | 1.1278 |
| Chlorine per cent | 49.88 | 50.05 |

The theoretical percentage of chlorine in piperylene dichlorides—$C_5H_8Cl_2$—is 51.04%.

Upon standing overnight, the foregoing samples rearranged to form products identical with those described in the previous examples. This was accompanied by a loss of their disagreeable odors, the rearranged products having the pleasant odors of the more usual forms of piperylene dichloride.

The reaction products obtained, after the foregoing rearrangement had taken place, may be summarized as follows:

| | Per cent |
|---|---|
| Low-boiling dichloride | 33.0 |
| Intermediate-boiling dichloride | 7.3 |
| High-boiling dichloride | 14.8 |
| Mono-chlorinated piperylene | 18.0 |

These products had the following physical properties:

|  | Low-boiling dichloride | High-boiling dichloride | Mono-chlorinated piperylene |
|---|---|---|---|
| Boiling point °C | 122 @ 5.5 mm | 141 @ 5.5 mm | 52 @ 45 mm |
| Density (d 20/4) | 1.1627 | 1.1266 | 0.907 |

Samples of the low-boiling piperylene dichloride may have densities (d 20/4) ranging from 1.140 to 1.180 and refractive indices ($N^{20}$) ranging from 1.4740 to 1.4770, while samples of the high-boiling piperylene dichloride may have densities ranging from 1.120 to 1.150 and refractive indices ranging from 1.4770 to 1.4800. This range in physical properties may be due to the presence, in varying quantities, of more than one isomeric piperylene dichloride in the indicated fractions.

Upon combining several samples of the respective fractions and refractionating the combined samples in an efficient column, samples possessing the following physical properties were obtained.

|  | Low-boiling dichloride | High-boiling dichloride | Theoretical values for $C_5H_8Cl_2$ |
|---|---|---|---|
| Boiling point °C | 42-43 @ 12 mm | 58-59 (12 mm) | |
| Density (d 20/4) | 1.171 | 1.127 | |
| Refractive index (N20) | 1.4766 | 1.4779 | |
| Chlorine per cent | 50.69, 50.47 | 49.71 | 51.04 |
| Carbon do | 43.52, 43.85 | 42.80 | 43.17 |
| Hydrogen do | 5.52 | 5.69 | 5.80 |
| Mol. weight | 143, 145 | 151 | 139 |
| Molar refraction | 33.43 | 34.72 | 34.56 |

The high-boiling dichloride reacts with bromine to form a solid bromine addition compound. A representative sample had a melting point of 77° C.

The low-boiling dichloride reacts with bromine to form a liquid bromine addition compound.

Representative samples of the low-boiling dichloride and the high-boiling dichloride were treated with ozone, after which the ozonides were hydrolyzed. Acetaldehyde, carbon dioxide, and lactic acid were obtained.

These results indicate that the preponderating constituent of both the high-boiling and the low-boiling dichlorides probably is 1,4-dichloropentene-2. As the high-boiling dichloride possesses a dielectric constant of 9.91, while the low-boiling dichloride has a dielectric constant of 6.21, it is highly probable that the low-boiling dichloride consists predominantly, if not entirely, of the trans form of 1,4-dichloropentene-2. The high boiling dichloride probably consists predominantly, if not entirely, of the cis form of 1,4-dichloropentene-2.

The foregoing conclusions obviously refer to fairly highly purified fractions. Fractions having a wider boiling range and a wider range of physical properties undoubtedly will contain substantial quantities of other piperylene dichlorides. The intermediate dichloride fractions also may contain dichlorides other than the cis and trans forms of 1,4-dichloropentene-2, and the fractions boiling just below the low-boiling dichloride and just above the high-boiling dichloride undoubtedly contain other piperylene dichlorides.

Considerable quantities of materials boiling above the high-boiling piperylene dichloride were obtained in all of the experiments listed. The chlorinated products contained in these residues comprise, in part, trichloropentenes, tetrachloropentanes, pentachloro pentanes, hexachloropentanes, and the like. The tetrachloropentanes are derived from the addition of a second molecule of chlorine to piperylene dichlorides, while the remainder of the products are derived from decomposition, or decomposition and addition, reactions.

However, the major portion of the residues obtained upon the fractionation of the reaction products resulting from the addition of chlorine to piperylene to form piperylene dichlorides undoubtedly is the result of the thermal polymerization of a portion of the piperylene dichloride present. As minute quantities of hydrogen chloride invariably are obtained when chlorinated products of the type described herein are fractionated, the polymerization of the piperylene dichlorides present undoubtedly are catalyzed by the hydrogen chloride liberated during the course of the distillation.

The foregoing explanation for the formation of at least a part of the residues normally obtained when piperylene dichlorides are fractionated satisfactorily accounts for the lower yields of piperylene dichloride obtained when relatively large quantities of piperylene are chlorinated and the resulting chlorinated products fractionated in a column possessing a large number of theoretical plates and operating with a fairly large reflux ratio.

In the same way, the chlorination of highly concentrated piperylene fractions in the absence of solvents or diluting agents results in the production of somewhat lower yields of piperylene dichlorides than when less highly concentrated fractions are employed, or when a solvent or diluting agent is added to the reaction mixture prior to or during the reaction, due to the polymerization of a portion of the piperylene dichlorides present in the reaction products in highly concentrated form during the chlorination and/or distillation operations.

As pointed out previously, these losses may be minimized by operating at the lowest possible pressure and temperature during the fractionating step, by fractionating a relatively small quantity of material in a given fractionating unit in order to reduce the time required for this operation, or, what is better, the use of a continuous fractionating system for this purpose, by the use of certain polymerizing inhibitors during the fractionation operations, and/or the use of certain agents designed to react with, or remove, the hydrogen chloride formed during the course of the distillation.

By a suitable control of the various steps required for the production of piperylene dichlorides, particularly from the standpoint of preventing, or retarding the rate of, undesirable secondary reactions, such as substitution and/or polymerizing reactions, excellent yields may be obtained from almost any desired piperylene charging stock.

As pointed out previously, the production of piperylene dichlorides is accompanied by the formation of monochlorinated piperylenes (monochloropentadienes) in substantial yields in certain cases. These monochloropentadienes, when uncontaminated with piperylene dichlorides, have densities ($d\ 20/4$) ranging from 0.90 to 0.950 and refractive indices ($n^{20}$) ranging from approximately 1.4390 to 1.470. A typical sample has a boiling point of 41° C. @ 104 mm., a density ($d^{20/4}$) of 0.9283, a refractive index ($n^{20}$) of 1.4474, and a molar refractivity of 29.40.

The monochloropentadienes obtained in this manner have a conjugated system of double bonds, as representative samples react with alpha-naphtha quinone to give a crystalline addition compound of the Diels-Adler type.

Upon ozonizing a sample of the monochloropentadiene, and hydrolyzing the resulting ozonide, acetaldehyde, formaldehyde, and oxalic acid were obtained. This indicates that the sample in question contained 3-chloro-pentadiene-1,3 and/or 2-chloropentadiene-1,3. It is highly probable, however, that other monochloropentadienes also are present in the materials obtained in the chlorination of piperylene.

PIPERYLENE-TETRACHLORIDES

Maximum yields of piperylene tetrachloride (tetrachloropentanes) are obtained when two mols of chlorine are reacted with piperylene, particularly light oil piperylene fractions, in such a way as to minimize substitution and/or polymerization reactions. The reaction may be carried out with either one or both of the reactants in the liquid or gaseous state, in the form of a solution in a suitable solvent or mixture of solvents, or dispersed in a gas or a mixture of gases.

The reaction may be carried out in a batchwise manner, if desired, such as by the addition of piperylene or a light oil piperylene fraction, or a solution thereof, to a solution of chlorine in a reaction vessel or unit provided with temperature control means.

The reaction also may be conducted in a continuous manner, such as by the simultaneous, or otherwise, addition of the reactants to a suitable reaction vessel or zone maintained at the desired reaction temperature. The reaction unit, if desired, may comprise a tube coil or tube bundle, or other suitable unit having a relatively narrow diameter, immersed in, or in contact with, a liquid bath maintained at the desired temperature level. Other temperature control means may, of course, be employed if desired.

Piperylene tetrachlorides also may be prepared by the reaction of one mol of chlorine with one mol of a piperylene dichloride, or mixture of piperylene dichlorides, either before or after the said dichlorides have been isolated from the reaction mixture.

In general, it may be said that excellent results are obtained when a slight excess of chlorine is maintained in the reaction vessel or zone throughout the reaction.

The reaction temperature may vary within fairly wide limits, such as from $-60°$ C. to $150°$ C., provided that suitable precautions are observed to inhibit, or retard the rate of, undesired secondary reactions, such as substitution, decomposition, and/or polymerizing reactions.

As the reaction product obtained is almost completely, if not entirely saturated, the removal of any hydrogen chloride present in the product prior to distillation, such as by washing with an aqueous caustic solution, may be dispensed with if desired.

As pointed out previously, piperylene tetrachlorides can be prepared by the addition of chlorine to piperylene or to a light oil piperylene fraction. The reaction mechanism involved probably comprises the addition of one mol of chlorine to piperylene to form piperylene dichloride, followed by the addition of a second mol of chlorine to the piperylene dichloride to form piperylene tetrachloride. This method is illustrated by the following examples.

*Example 8*

A 250 gram portion of piperylene, in the form of a light oil piperylene fraction containing 80% by weight of piperylene, was added to 250 grams of chloroform and the mixture placed in a 3-neck flask provided with a mechanical stirrer. The flask was immersed in a cooling bath maintained at a temperature of $10°$ C. Chlorine then was introduced into the reaction vessel at a constant rate until slightly more than two mols, based on the number of mols of piperlylene present, has been added.

Excess chlorine then was removed by heating the reaction product on a water bath under reduced pressure, after which they were fractionated in a column having an efficiency equivalent to 23 theoretical plates, using a reflux ratio varying from 3:1 on the respective plateaus obtained to 10:1 between adjacent plateaus.

After the piperylene tetrachlorides had been completely removed, the residue was distilled in a modified Claissen flask to prevent undue losses due to polymerization. The piperlylene pentachlorides (pentachloropentanes) were isolated in this manner.

The results obtained may be summarized as follows, in order of increasing boiling points.

| Component | Yield, per cent by weight |
|---|---|
| Trichloropentenes | 20.7 |
| Intermediate fraction | 2.1 |
| Piperylene tetrachloride—D | 6.3 |
| Intermediate fraction | 4.8 |
| Piperylene tetrachloride—E | 21.6 |
| Piperylene tetrachloride—F | 10.7 |
| Intermediate fraction | 4.5 |
| Pentachloropentanes | 11.2 |
| Intermediate and higher chlorinated fractions | 9.0 |

The overall yield of piperylene tetrachlorides thus was 48%.

In addition, small quantities of dicholoropentanes were obtained. As these compounds undoubtedly were derived from the amylenes present in the light oil piperylene fraction, they have not been included in the yield figures.

The piperylene tetrachlorides obtained had the following physical properties.

| | Boiling point, °C. | Density ($d\ 20/4$) | Refractive index ($n^{20}$) |
|---|---|---|---|
| Isomer D | 86.5 @ 16 mm | 1.3776 | 1.4966 |
| Isomer E | 90 @ 6.5 mm | 1.4043 | 1.5030 |
| Isomer F | 91 @ 6.5 mm | 1.4054 | 1.5032 |

Isomer F has a melting point of $57.5°$ C., the remaining isomers are liquids at room temperatures.

The piperylene tetrachlorides then were analyzed, with the following results.

| | Carbon, per cent | Hydrogen, per cent | Chlorine, per cent | Molar refraction |
|---|---|---|---|---|
| Isomer D | | | 67.39, 67.29 | 44.55 |
| Isomer E | 28.60 | 3.85 | 67.28, 67.81 | 44.20 |
| Isomer F | 28.20, 28.40 | 3.90, 4.10 | 67.41 | |
| Theory for $C_5H_8Cl_4$ | 28.59 | 3.85 | 67.59 | 44.90 |

Each of the three isomeric piperylene tetrachlorides are saturated, since they do not react with either bromine or potassium permanganate. Upon distilling with zinc dust piperylene is formed in each case. It is apparent, therefore, that these piperylene tetrachlorides are space isomers of 1,2,3,4-tetrachloropentane.

The trichloropentenes were obtained in the form of two isomers, the lower boiling of which had the following physical properties.

Boiling range, °C _____ 161–171 @ 760 mm.
Density ($d\ 20/4$) _____ 1.2403
Refractive index ($n^{20}$) _____ 1.4741
Chlorine, found (%) _____ 59.80, 61.53
Chlorine, theory for $C_5H_7Cl_3$ (%) _____ 61.32
Molar refraction, found _____ 39.33
Molar refraction, theory _____ 39.42

The higher boiling isomer was somewhat unstable, but had the following physical properties.

Boiling range, °C _____ 185–186 @ 760 mm.
Density ($d\ 20/4$) _____ 1.2820
Refractive index ($n^{20}$) _____ 1.4969
Chlorine, found (%) _____ 61.12, 61.33
Chlorine, theory for $C_5H_7Cl_3$ (%) _____ 61.32
Molar refraction, found _____ 39.52
Molar refraction, theory _____ 39.42

The pentachloropentane fraction had the following physical properties.

Boiling point, °C _____ 103–106 @ 2.5 mm.
Density ($d\ 20/4$) _____ 1.4854
Refractive index ($n^{20}$) _____ 1.5226
Chlorine, found (%) _____ 72.10, 70.76
Chlorine, theory for $C_5H_7Cl_5$ (%) _____ 72.59
Molar refraction, found _____ 50.24
Molar refraction, theory _____ 49.63

*Example 9*

This experiment was carried out in the same manner as Experiment 8, with the exception that the piperylene fraction was chlorinated in the absence of any solvent. The following results were obtained.

| Component | Yield, per cent by weight |
| --- | --- |
| Trichloropentenes | 14.1 |
| Intermediate fraction | 7.1 |
| Piperylene tetrachloride—D | 4.9 |
| Intermediate fraction | 2.3 |
| Piperylene tetrachloride—E | 22.6 |
| Piperylene tetrachloride—F | 9.2 |
| Intermediate fraction | 3.3 |
| Pentachloropentanes | 7.0 |
| Intermediate and higher chlorinated fractions | 9.0 |

The overall yield of piperylene tetrachlorides thus was 39%.

Another satisfactory method of preparing piperylene tetrachlorides comprises the addition of piperylene, or a light oil piperylene fraction, to a solution of chlorine in an inert solvent. As chlorine is in excess throughout the entire reaction, the piperylene dichloride intermediates probably have only a transitory existence. The possibility of undesirable side reactions are greatly diminished, resulting in correspondingly higher yields of piperylene tetrachlorides. This method is illustrated by the following example.

Example 10

A quantity of chlorine slightly in excess of that required to completely chlorinate 250 grams of piperylene, in the form of an 80% light oil piperylene fraction, was dissolved in 250 grams of chloroform contained in a 3-neck flask at a temperature of −45° C. The piperylene fraction was added to the chloroform solution of chlorine with good agitation during a period of 7 hours, the said fraction being introduced under the surface of the chloroform in the reaction vessel. The reaction temperature was maintained at approximately −45° C. during the entire period.

Excess chlorine then was removed by heating the reaction product on the steam plate under reduced pressure, after which the reaction mixture was fractionated in a column possessing 23 theoretical plates. Reflux ratios varying from 3:1 to 10:1 were employed throughout the fractionation operations.

After the piperylene tetrachlorides had been completely removed, the residue was distilled in a modified Claissen flask in order to prevent undue losses due to decomposition and polymerization.

The following results were obtained.

| Component | Yield, per cent by weight |
| --- | --- |
| Trichloropentenes | 3.5 |
| Intermediate fraction | 2.2 |
| Piperylene tetrachloride—D | 6.5 |
| Intermediate fraction | 6.3 |
| Piperylene tetrachloride—E | 41.6 |
| Piperylene tetrachloride—F | 9.7 |
| Intermediate fraction | 0.5 |
| Pentachloropentanes | 19.5 |
| Intermediate and higher chlorinated fractions | 0.2 |

The overall yield of piperylene tetrachlorides obtained in this experiment, therefore, is 64.1%.

It will be noted that the yield of trichloropentenes has been sharply reduced. The lower boiling trichloropentene isomer was entirely absent.

Small portions of the pentachloropentanes obtained were isolated in the form of isomers having melting points of 72.5–73.5° and 99.5° C., respectively.

Piperylene tetrachlorides also may be prepared by the introduction of a mixture of nitrogen and piperylene, in the gaseous state, into a solution of chlorine in chloroform, or other suitable solvent. The nitrogen serves both as a carrier for the piperylene and as a diluting agent to retard the severity of the reaction, thus preventing, or reducing the reaction rate, of undesired side reactions. This method is illustrated by the following examples.

Example 11

A 200 gram portion of chloroform was placed in a cylindrical glass vessel immersed in a cooling bath, after which gaseous chlorine was introduced into the bottom of the reaction vessel through a porous tube at a constant rate. An 80% light oil piperylene fraction was placed in a second vessel and heated to the desired temperature, after which a stream of nitrogen was introduced into the unit under the surface of the piperylene fraction contained therein. The temperature in this carburetting device was maintained at a level sufficient to volatilize 29 grams of the piperylene fraction per hour with a flow of nitrogen equivalent to 10 liters per hour.

The mixture of nitrogen and gaseous piperylene fraction also was introduced under the surface of the chloroform in the cylindrical glass reaction vessel, the respective rates of flow of chlorine and of the nitrogen-piperylene mixture being adjusted in such a way as to maintain a slight excess of chlorine in the reaction vessel at all times.

The temperature within the reaction vessel was maintained at −20° C. throughout the reaction. A total of 202 grams of piperylene, in the form of an 80% light oil piperylene fraction, was added to the reaction vessel during the course of the reaction.

The excess chlorine, chloroform, and other volatile materials were removed by heating the reaction mixture in a steam bath for 4 hours, after which the crude reaction product was fractionated in a column possessing 23 theoretical plates, a reflux ratio varying from 3:1 to 10:1 being employed throughout the fractionation operations.

After completely removing the piperylene tetrachlorides, the residue was distilled in a modified Claissen flask to isolate the pentachloropentanes and more highly chlorinated derivatives.

The following results were obtained.

| Component | Yield, per cent by weight |
| --- | --- |
| Trichloropentenes | 18.2 |
| Intermediate fraction | 2.7 |
| Piperylene tetrachloride—D | 5.8 |
| Intermediate fraction | 5.6 |
| Piperylene tetrachlorides E and F | 48.5 |
| Intermediate fraction | 7.4 |
| Pentachloropentanes | 11.8 |

The yield of piperylene tetrachlorides obtained in this experiment therefore was 59.9%.

Approximately 75% of the pentachloropentanes obtained were solids at room temperature.

Example 12

This was a repetition of Example 11, with the exception that a 90% light oil piperylene fraction was employed. A total of 216 grams of piperylene was chlorinated at a temperature of 0° C. during the reaction.

The following results were obtained.

| Component | Yield, per cent by weight |
| --- | --- |
| Trichloropentenes | 7.3 |
| Intermediate fraction | 7.3 |
| Piperylene tetrachloride—D | 4.6 |
| Intermediate fraction | 2.4 |
| Piperylene tetrachlorides E and F | 42.0 |
| Intermediate fraction | 1.9 |
| Pentachloropentanes and higher chlorinated derivatives | 14.0 |

The total yield of piperylene tetrachlorides obtained in this experiment was 49.0%.

A convenient method for the preparation of piperylene tetrachlorides comprises the chlorination of gaseous piperylene, suitably in admixture with a diluent such as nitrogen, in the gaseous phase in a continuous unit. This is illustrated by the following examples.

*Example 13*

The reaction vessel consisted of a bulb-shaped reflux condenser cooled with water. The nitrogen-piperylene mixture was introduced into the bottom of the vertical reaction tube, the chlorine delivery tube being placed approximately two inches above the tube used for the entry of the nitrogen-piperylene mixture in order to insure an excess of chlorine in the reaction zone at all times. The nitrogen-gaseous piperylene mixture was generated in the carburetting unit described in Example 11.

An 80% light oil piperylene fraction was volatilized in a stream of nitrogen and continuously charged to the reaction unit. Chlorine was simultaneously introduced into the reaction zone at a rate sufficient to maintain a slight excess of chlorine in the chlorinating vessel.

The piperylene was chlorinated at an average rate of 30 grams per hour, and the reaction was continued until a total of 208 grams had been chlorinated. The reaction temperature was maintained at 135° C. throughout the course of the reaction.

The reaction products were continuously discharged from the reaction zone in the vapor state. The products were condensed in a suitable unit cooled with ice.

The reaction products were heated on a steam bath for 4 hours in order to remove the excess chlorine present, after which the residue was fractionated in a column possessing 23 theoretical plates. The following results were obtained.

| Component | Yield, per cent by weight |
| --- | --- |
| Trichloropentenes | 5.9 |
| Intermediate fraction | 5.0 |
| Piperylene tetrachloride—D | 12.6 |
| Intermediate fraction | 2.7 |
| Piperylene tetrachlorides E and F | 40.7 |
| Intermediate fraction | 6.9 |
| Pentachloropentanes (solid) | 9.5 |
| Pentachloropentanes (liquid) | 16.2 |

The overall yield of piperylene tetrachlorides, therefore, was 56.0%.

*Example 14*

This was a repetition of Example 13, with the exception that a 90% light oil piperylene fraction was used, a chlorinating rate of 24 grams of piperylene per hour was employed, and the reaction temperature was maintained at 110° C.

The following results were obtained.

| Component | Yield, per cent by weight |
| --- | --- |
| Mixture of trichloropentenes and piperylene tetrachlorides | 2.9 |
| Piperylene tetrachloride—D | 9.2 |
| Intermediate fraction | 6.8 |
| Piperylene tetrachlorides E and F | 30.5 |
| Intermediate fraction | 6.6 |
| Pentachloropentanes (solid) | 18.0 |
| Pentachloropentanes and higher boiling products | 18.9 |

The total yield of piperylene tetrachlorides obtained amounts to 46.5%.

*Example 15*

This experiment was a repetition of Example 13, with the exception that a 90% light oil piperylene fraction was employed, and the piperylene was chlorinated at the rate of 92 grams per hour.

The following results were obtained.

| Component | Yield, per cent by weight |
| --- | --- |
| Trichloropentenes | 7.9 |
| Piperylene tetrachloride—D | 28.8 |
| Piperylene tetrachlorides E and F | 20.3 |
| Intermediate fraction | 4.1 |
| Pentachloropentanes (solid) | 11.0 |
| Pentachloropentanes and higher boiling products | 6.1 |

The total quantity of piperylene tetrachlorides obtained was equivalent to a yield of 49.1%.

As piperylene tetrachloride-F has a boiling point only one degree above that of piperylene tetrachloride-E, the separation of the two forms by fractional distillation is a fairly difficult undertaking. A combined fractionation and crystallization process may be employed to obtain the material in an acceptable state of purity. It is highly probable, however that piperylene tetrachloride-E fractions are contaminated in most cases with small quantities of F isomer.

Piperylene tetrachloride-D may have a density ($d$ 20/4) ranging from 1.3670 to 1.3870 and a refractive index ($n^{20}$) ranging from 1.4960 to 1.5000, while piperylene tetrachloride-E may have a density ranging from 1.4010 to 1.4260 and a refractive index ranging from 1.5010 to 1.5050.

The preparation of a fourth isomer of piperylene tetrachloride may be accomplished in the following manner.

*Example 16*

A 75 gram portion of piperylene, in the form of a 77.5% light oil piperylene fraction, was placed in a 3-neck flask provided with a mechanical agitator, after which 135 grams of chlorine was added at a constant rate during a period of 6 hours at a temperature of 15° C. A 10 gram portion of iodine was added to the reaction vessel at this point. An orange colored precipitate of iodine chloride was formed, which was removed by filtration.

The filtrate was washed with an aqueous sodium carbonate solution, dried with anhydrous calcium chloride, and fractionated in a column containing 11 theoretical plates.

Piperylene tetrachloride-G, having the following physical properties, was isolated from the reaction products.

Boiling point, °C _____ 148 @ 6 mm.
Density ($d$ 20/4) _____ 1.4082
Refractive index ($n^{20}$) _____ 1.5013
chlorine, found (5) _____ 66.44, 66.58
Chlorine, theory for $C_5H_8Cl_4$ (%) _____ 67.56

A repetition of this experiment gave a similar sample having a boiling point of 148° C. @ 5 mm., a density ($d$ 20/4) of 1.397, and a refractive index ($n^{20}$) of 1.4991.

HIGHER CHLORINATED PIPERYLENE DERIVATIVES

In the preceding section, the production of pentachloropentanes and higher chlorinated derivatives of piperylene as by-products of the preparation of the isomeric piperylene tetrachlorides was described. In the vapor phase reactions, in which piperylene, in admixture with nitrogen, was chlorinated in the vapor state, it was noted that increased yields of pentachloropentanes were obtained when the contact time in the reaction zone was increased. By the use of longer contact times in the presence of an excess of chlorine, the yield of pentachloropentanes and higher chlorinated derivatives of piperylene can be largely increased.

A second method which can be used for the production of products of this type in good yields comprises the chlorination of piperylene, or of lower chlorinated piperylene derivatives, in the presence of actinic rays, such as those emitted by the sun or by various types of special bulbs such as the photo-flood bulb. The process can be carried out in the liquid or gaseous state, and in a batchwise or continuous manner.

The method is illustrated by the following example.

*Example 17*

Piperylene tetrachloride was prepared by the addition of 168 grams of piperylene, in the form of a 90% light oil fraction, in the gaseous state, and in the presence of nitrogen, to a reaction zone containing an excess of chlorine and maintained at a temperature of 135° C. The piperylene was chlorinated at the rate of 48 grams per hour.

A total of 565 grams of chlorinated products ($d=1.396$), consisting essentially of piperylene tetrachlorides, were obtained. The reaction product was transferred to a three-neck flask and chlorinated under the influence of illumination furnished by a photo-flood bulb for a period of 5 hours at a temperature of 90° C. A total of 100 grams of chlorine was absorbed during this period, and the product had a density of 1.557.

The reaction product was heated on a steam bath for a period of 3 hours under reduced pressure in order to remove excess chlorine, after which the material was fractionated in a 23-plate column, using a reflux ratio of 4:1. After the removal of the major portion of the piperylene tetrachloride present, the residue was transferred to a modified Claissen flask and distilled to minimize decomposition and/or substitution reactions.

A mixture of piperylene tetrachlorides and pentachloropentanes was obtained in a yield of 14.7%, while a yield of pentachloropentanes equivalent to 31.5% also was obtained. The remainder of the reaction products comprised hexachloropentanes, with traces of heptachloropentanes.

The pentachloropentanes obtained in a yield of 31.5% had the following physical properties:

|  | Boiling point, °C | Density ($d$ 20/4) | Refractive index ($n^{20}$) |
|---|---|---|---|
| Fraction 1 | 99 @ 4 mm | 1.5087 | 1.5139 |
| Fraction 2 | 111 @ 3.5 mm | 1.5462 | 1.5218 |

Pentachloropentanes may have densities which range between 1.4840 and 1.5480 and may have refractive indices which range between 1.5120 and 1.5230.

The hexachloropentanes obtained had the following physical properties:

|  | Boiling point, °C | Density ($d$ 20/4) | Refractive index ($n^{20}$) |
|---|---|---|---|
| Fraction 3 | 125 @ 4 mm | 1.5793 | 1.5279 |
| Fraction 4 | 133 @ 9 mm | 1.6202 | 1.5322 |

| Molar refractivity | | Chlorine, per cent | |
|---|---|---|---|
| Theory | Found | Theory | Found |
| 54.49 | 54.38 | 76.32 | 75.82 |
| 54.49 | 53.21 | 76.32 | 76.83 |

Hexachloropentanes may have densities which range between 1.5780 and 1.6220 and may have refractive indices which range between 1.5260 and 1.5340.

While various procedures have been particularly described these are of course subject to considerable variation. For example chlorination may take place at any suitable pressure such as atmospheric, sub-atmospheric or super-atmospheric as desired.

Therefore it will be understood that the foregoing specific examples are given by way of illustration and that changes, omissions, additions, substitutions and/or modifications might be made within the scope of the claims without departing from the spirit of the invention.

I claim:

1. A process for preparing 1,2,3,4-tetrachloropentane from a light oil piperylene fraction containing up to 90% by weight of piperylene and also containing other conjugated diolefine material of from 4 to 5 carbon atoms per molecule comprising chlorinating said fraction by the addition of approximately two mol equivalents of chlorine to approximately one mol equivalent of said piperylene.

2. In a process for preparing 1,2,3,4-tetrachloropentane from a light oil piperylene fraction containing up to 90% by weight of piperylene and also containing other conjugated diolefine material of from 4 to 5 carbon atoms per molecule in which said fraction is chlorinated by the addition of approximately two mol equivalents of chlorine to approximately one mol equivalent of said piperylene, the steps of contacting said light oil piperylene fraction with chlorine in the presence of an inert gas while maintaining the temperature in the reaction zone below 150° C., and removing the resulting reaction products from the reaction zone as formed.

3. In a process for preparing 1,2,3,4-tetrachloropentane from a light oil piperylene fraction containing up to 90% by weight of piperylene and also containing other conjugated diolefine material of from 4 to 5 carbon atoms per molecule in which said fraction is chlorinated by the addition of approximately two mol equivalents of chlorine to approximately one mol equivalent of said piperylene, the steps of contacting said light oil piperylene fraction at a temperature below 150° C. with chlorine in the presence of an inert gas while maintaining a slight excess of chlorine with respect to piperylene in the reaction zone, removing the resulting reaction products from the reaction zone as formed, neutralizing said reaction products by contact with an alkaline agent, and fractionally distilling said reaction products after neutralization to recover 1,2,3,4-tetrachloropentane.

FRANK J. SODAY.